United States Patent [19]

Bauer

[11] Patent Number: 5,853,643
[45] Date of Patent: Dec. 29, 1998

[54] METHOD FOR CONSTRUCTING A LIQUID-IMPERVIOUS ELECTRIC MOTOR ASSEMBLY

[76] Inventor: Scott V. Bauer, 499 Safinwood Ter., Buffalo Grove, Ill. 60089

[21] Appl. No.: 690,233

[22] Filed: Jul. 19, 1996

[51] Int. Cl.$^6$ .......................... B29C 45/14; B29C 45/36; B29C 70/72

[52] U.S. Cl. .................. 264/272.15; 264/272.19; 264/272.2

[58] Field of Search .................. 264/272.19, 272.2, 264/272.11, 272.15, 275

[56] References Cited

U.S. PATENT DOCUMENTS

| | | | |
|---|---|---|---|
| 2,967,346 | 1/1961 | McMaster et al. | 264/272.2 |
| 3,075,250 | 1/1963 | Strohm et al. | 264/272.2 |
| 3,182,111 | 5/1965 | Hogue . | |
| 3,210,577 | 10/1965 | Hogue | 264/272.2 |
| 3,236,937 | 2/1966 | Harnkess et al. . | |
| 3,268,645 | 8/1966 | Stampfli . | |
| 3,344,513 | 10/1967 | Bemmann et al. | 29/596 |
| 3,375,312 | 3/1968 | Hart | 264/272.19 |
| 3,979,822 | 9/1976 | Halm | 264/272.2 |
| 4,083,917 | 4/1978 | Hallerback et al. | 264/272.2 |
| 4,102,973 | 7/1978 | Hanning | 264/272.2 |
| 4,173,822 | 11/1979 | Flitterer et al. | 29/596 |
| 4,370,292 | 1/1983 | Yanase et al. | 264/272.11 |
| 4,573,258 | 3/1986 | Io et al. | 29/596 |
| 4,663,835 | 5/1987 | Callier, Sr. | 264/272.2 |
| 4,763,095 | 8/1988 | Bradt | 264/272.19 |
| 4,806,083 | 2/1989 | LaGrange et al. | 264/272.2 |
| 4,862,582 | 9/1989 | Henck | 264/272.2 |
| 5,095,612 | 3/1992 | McAvena | 264/272.2 |
| 5,232,652 | 8/1993 | Bianco | 264/272.2 |
| 5,331,730 | 7/1994 | Brinn, Jr. | 264/272.19 |
| 5,423,117 | 6/1995 | Okada et al. | 264/272.19 |
| 5,584,114 | 12/1996 | McManus | 264/272.2 |
| 5,628,951 | 5/1997 | Kitajima et al. | 264/272.2 |

OTHER PUBLICATIONS

A Working Manual on Molded Case Circuit Breakers, Fourth Ed., Westinghouse Elec. Co., pp. 106–108.

Slepian, J.; Strom, A.P. "Arcs In Low–Voltage A.C. Networks", pp. 847–853; Sep. 1931.

Slepian, J. "Theory of the Deion Circuit–Breaker", pp. 523–527; Apr. 1929.

Slepian, J. "Extinction of an A–C Arc", pp. 1398–1408;.

*Primary Examiner*—Angela Ortiz
*Attorney, Agent, or Firm*—Jones, Day, Reavis & Pogue

[57] ABSTRACT

A method for encapsulating an electric motor in resinous material by an injection molding process comprises providing a motor assembly having an armature and associated drive shaft supported at one end by a bearing bracket. The motor is inserted into a cavity of a multi-piece mold in which one part of the mold has a bore for slidingly receiving the motor shaft with the bearing bracket in close abutment with the mold. The motor is thus supported centrally of the mold cavity. Liquid resinous material is injected into the mold preferably from a side of the motor opposite the motor shaft such that the liquid material forces the motor bearing bracket against the apertured part of the mold. The resinous material is thereby prevented from entering into the bearing bracket into contact with the motor shaft. In order to positively locate the motor in a predetermined orientation within the mold cavity, the bearing bracket may be provided with a small recess into which a cooperating projection of the mold is received.

7 Claims, 4 Drawing Sheets

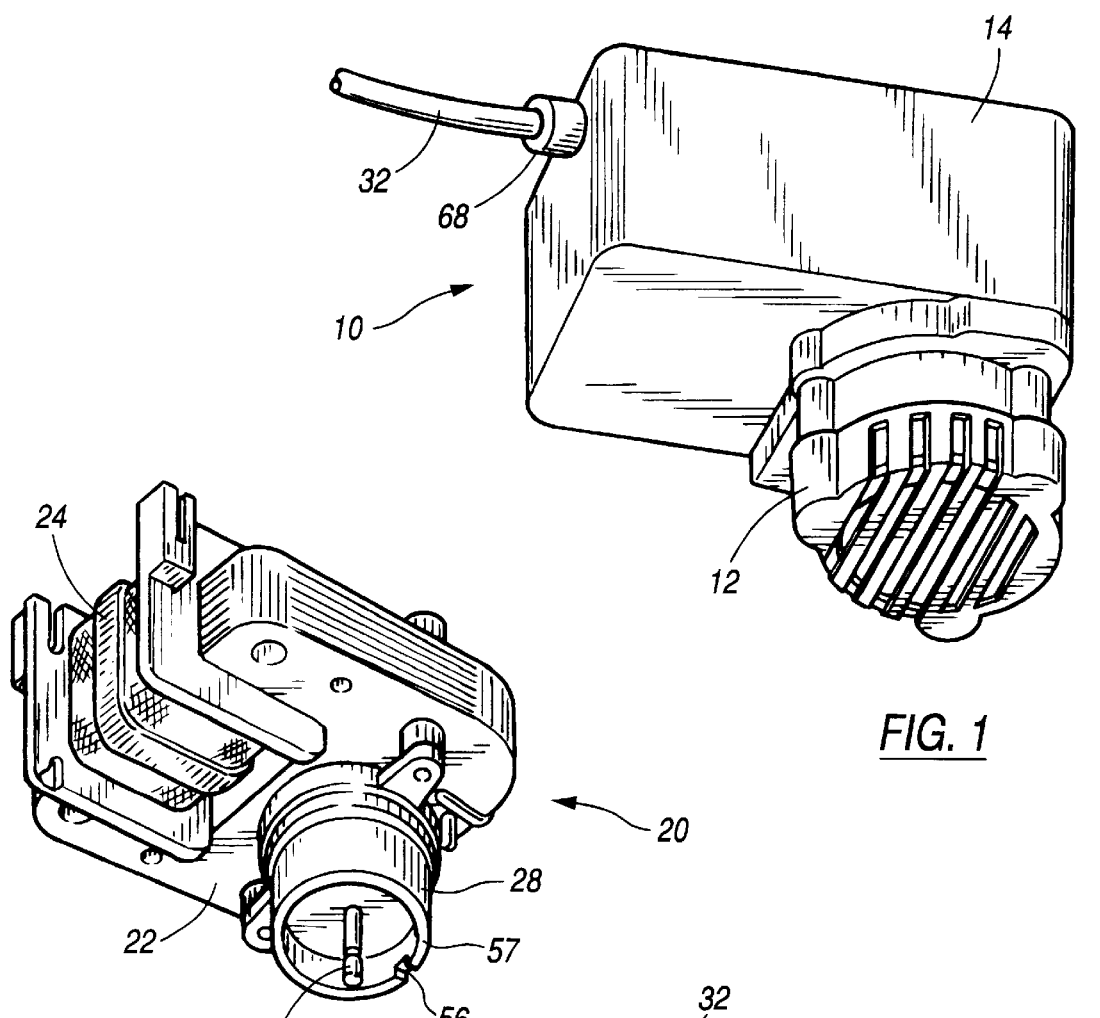
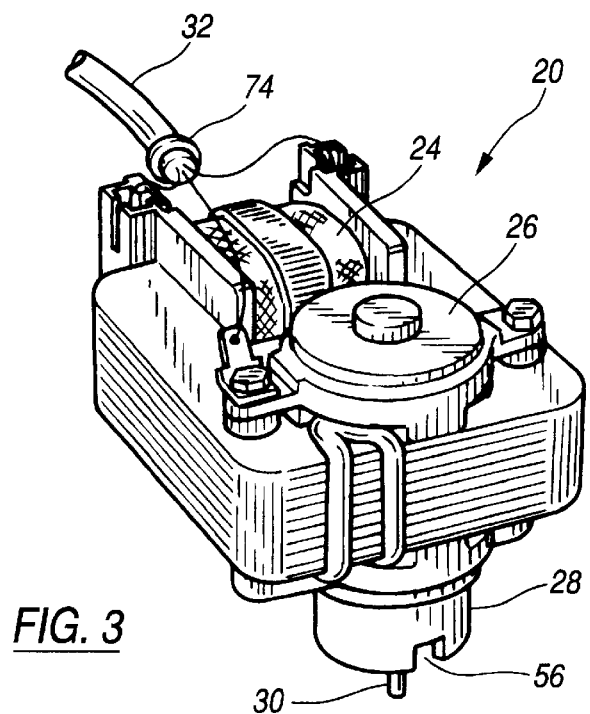

METHOD FOR CONSTRUCTING A LIQUID-IMPERVIOUS ELECTRIC MOTOR ASSEMBLY

BACKGROUND OF THE INVENTION

1. Field of the Invention

The present invention relates generally to a plastic injection molded pump motor and, more particularly, to a method for encapsulating a motor by a plastic injection molding technique whereby the motor is impervious to liquids and thereby can advantageously be used in a submersible pump assembly.

2. Description of the Prior Art

Submersible pumps have long been available for use as sump pumps or utility pumps of various types. These types of pumps typically comprise an electric motor which is enclosed in a sealed multi-piece housing. A motor shaft exits the housing at a liquid-tight seal for connection to a suitable pump volute. Typically, the housing is a cast metal structure such that the pump is suitable for heavy-duty use.

There are some applications for submersible pumps in which the pump motor may be encapsulated in plastic instead of having a multi-piece metal housing. One such application is in the construction of decorative fountains in which water is pumped from a collecting basin to a discharge port and cascades over a sculpture of some type back to the basin. Statuary articles are also available which use pumped water for various aesthetic purposes. Plastic encapsulated pump motors have been advantageously constructed by placing the motor in a mold into which liquid epoxy is poured. This type of pump construction has the disadvantage that the motor is permanently encapsulated and, therefore, cannot be readily repaired if it fails for some reason. However, the plastic encapsulation of the motor is by far less expensive in assembly cost than is a sealed multi-piece housing construction, and thus, an encapsulated pump motor may be manufactured with such economy, particularly for small light-duty pump uses, as to render the entire pump motor cost-effectively discardable should it fail.

A disadvantage of using epoxy to construct an encapsulated motor for use in a submersible pump assembly is that the set-up time is quite considerable for epoxy materials generally suitable for encapsulating a motor. In fact, in an epoxy encapsulating process practiced by the assignee herein wherein pump motors are made for decorative fountains, it has been found that a full twenty-four hours minimum time is required to allow for adequate epoxy hardening. This process time necessarily adds to the cost of constructing encapsulating motors.

A form of submersible pump is known wherein the motor housing is formed in a mold from an injected, rigid expandable foam material. Such a pump is disclosed, for example, in U.S. Pat. No. 4,806,083, issued Feb. 21, 1989. By molding the motor housing with injected foam, a pump can be manufactured with considerable time savings over epoxy encapsulating methods. However, the pump disclosed in the aforesaid '083 patent requires a specially designed metal casing to be installed over the pump motor before molding takes place. This patent specifically teaches that a casing is required because it is not practical to form a molded jacket directly around the motor by a method such as injection molding. The injected plastic would enter the motor bearings and the areas between the rotor and stator. As also taught by this patent, the motor windings would be damaged when subjected to the high temperature of injected plastic. Indeed, it has heretofore not been known to be practical to encapsulate a motor directly by an injection molding process. Similarly, it has heretofore not been known how a motor could be supported in a mold in such a way as to be encapsulated by injection molding without contaminating the motor bearings and armature, for example.

Accordingly, it is desirable to provide a method for directly injection encapsulating a pump motor whereby economies may be realized in the production of submersible pumps. It is further desirable to provide such a method wherein there is no contamination of the motor bearings or armature with resinous liquid plastic during the injection process. Still further, it is desirable to provide such a method wherein the motor can be easily placed and supported within the mold and yet the completed motor can be readily ejected from the mold after encapsulation.

SUMMARY OF THE INVENTION

The present invention improves over the prior art by providing a method wherein a motor is encapsulated by resinous material directly by an injection molded process. A motor assembly is provided having an armature and associated drive shaft supported at one end by a bearing bracket. A power cord is suitably connected to the motor. The motor is inserted into a cavity of a multi-piece mold in which one part of the mold has an aperture for slidingly receiving the motor shaft with the bearing bracket in close abutment with the mold. The motor is thus supported centrally of the mold cavity. The power cord exits the mold along a plane defined by two separable mold parts. Liquid resinous material is injected into the mold preferably from a side of the motor opposite the motor shaft such that the liquid material forces the motor bearing bracket against the apertured part of the mold. Liquid resinous material is thereby prevented from entering into the bearing bracket into contact with the motor shaft. The resinous material may be cooled very quickly and the encapsulated motor may be readily ejected from the mold using conventional ejection pins. In order to positively locate the motor in a predetermined orientation within the mold cavity, the bearing bracket may be provided with a small recess into which a cooperating projection of the mold is received.

BRIEF DESCRIPTION OF THE DRAWINGS

The foregoing and other novel features and advantages of the invention will be better understood upon a reading of the following detailed description taken in conjunction with the accompanying drawings wherein:

FIG. 1 is a perspective view of a pump constructed in accordance with the principles of the invention;

FIG. 2 is a perspective view of a pump motor suitable for construction of the pump shown in FIG. 1;

FIG. 3 is another perspective view of the motor of FIG. 2;

DETAILED DESCRIPTION OF THE PREFERRED EMBODIMENT

Figure 4:
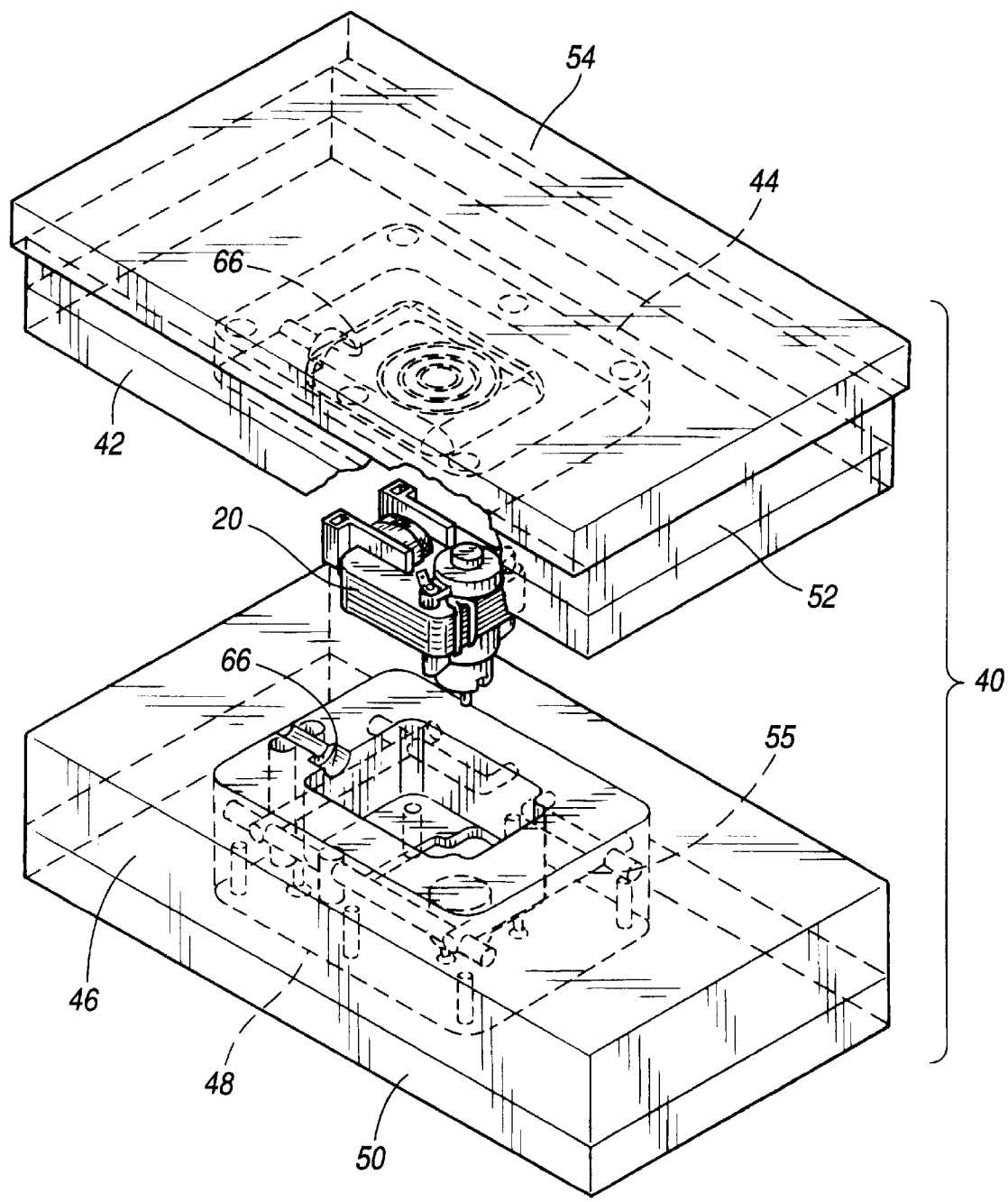
FIG. 4 is a perspective view of a mold suitable for injection encapsulation of the motor of FIGS. 2 and 3, showing the mold in an open position.

Referring now to the drawing and initially to FIG. 1, a submersible pump constructed in accordance with the principles of the invention is designated generally by the reference numeral 10. The pump 10 is particularly suitable for use in the construction of fountains and statutory in which water is pumped from a collecting basin to a discharge point and then returns to the basin to be recycled. A suitable screen 12 covers a conventional pump volute (not shown) which is driven by a motor assembly 14.

Turning to FIGS. 2 and 3, an electric motor suitable for use in the construction of the pump 10 is designated by the reference numeral 20. For purposes of a light duty pump, the motor 20 may be a shaded pole motor having C-frame laminations 22 and conventional winding 24. A bearing cap 26 encloses one end of the armature (not shown) while a bearing bracket 28 supports the armature shaft 30. suitable jacketed multi-conductor power cord 32 is connected to the motor 20 in a manner well-known in the art. The illustrated motor 20 can be purchased complete from Uppco Incorporated of Monticello, Ind. This type of motor is not intended to be water proof. However, it is dust resistant and is designed with clearances between the frame and armature core of on the order of 0.001 to 0.002 inch maximum.

Figure 5:
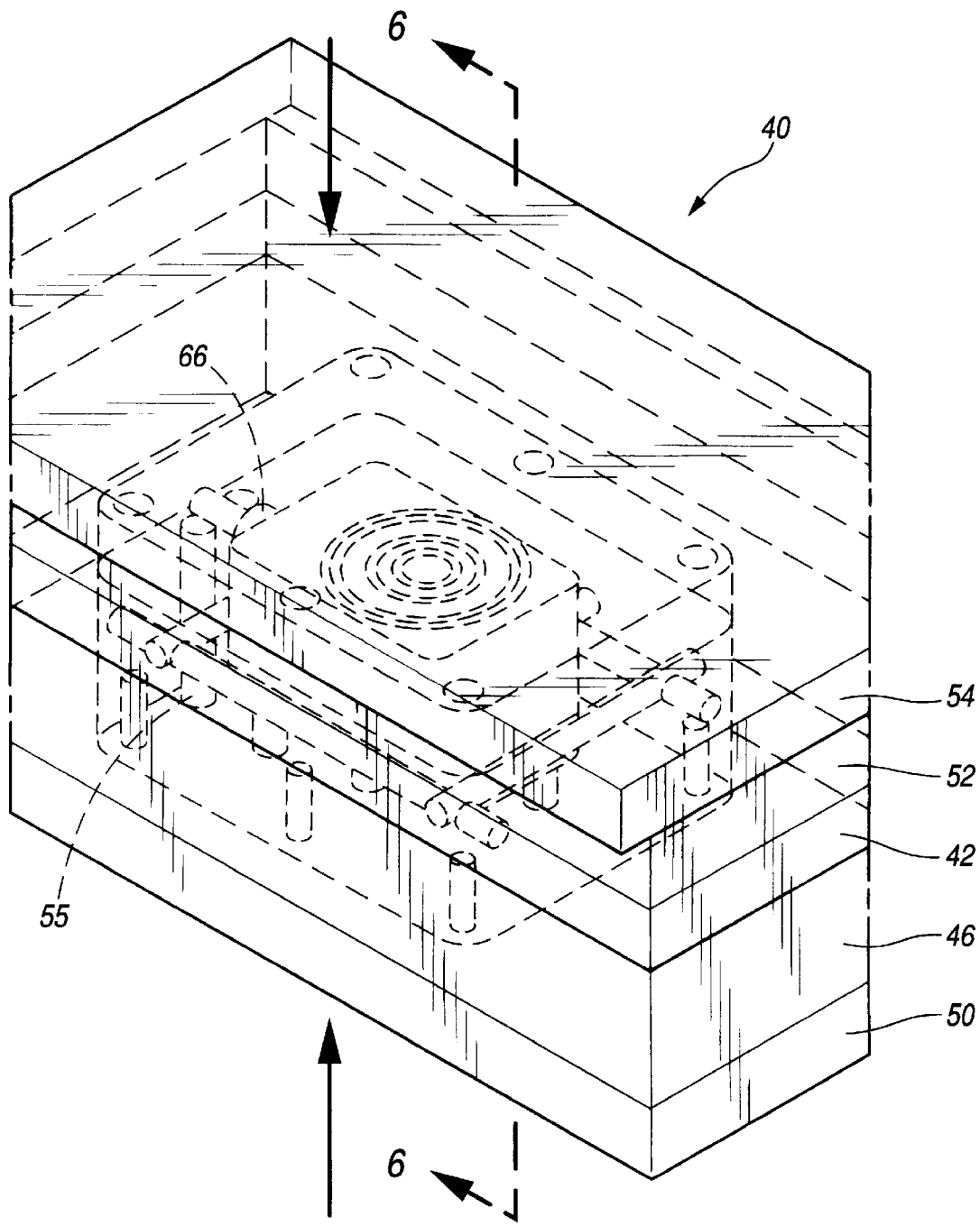
FIG. 5 is a perspective view of the mold of FIG. 4 shown in a closed position.
Figure 6:
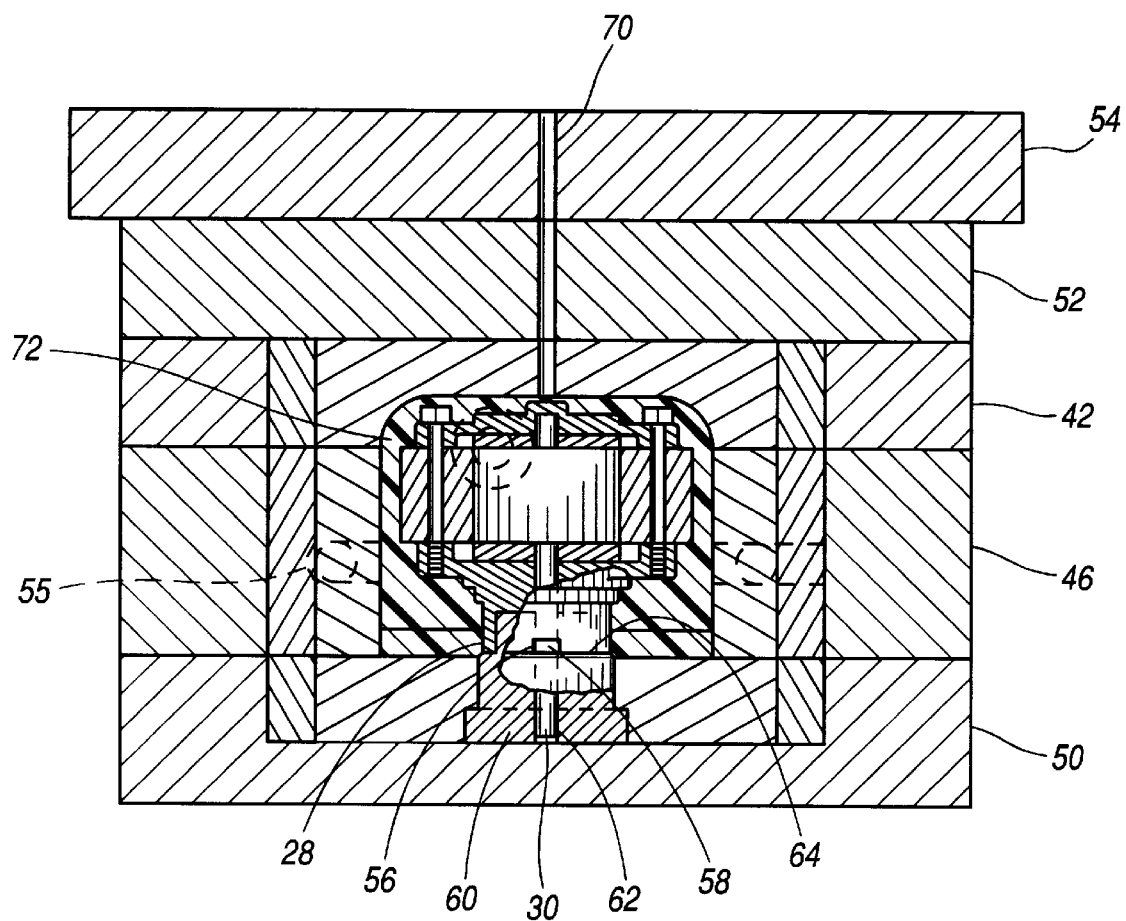
FIG. 6 is a cross-sectional view taken substantially along the line 6—6 of FIG. 5.

Referring to FIGS. 4–6, a mold constructed according to the invention is designated generally as 40. The mold 40 comprises as its principle components an "A" plate 42 with gate side cavity 44 and a "B" plate 46 with ejection side cavity 48. Suitable backup plates 50 and 52 are provided together with a clamping plate 54. In a manner well-known in the art, the mold 40 is provided with suitable internal cooling conduits 55 such that the temperature of the mold can be controlled. As also well-known, ejection pins (not shown) preferably extend through the backup plate 50.

As best seen in FIGS. 3 and 6 and in accordance with an important feature of the invention, the bearing bracket 28 is provided with a notch 56 formed on a flat annular surface 57 and the notch 56 is dimensioned and configured to closely receive a projection 58 extending into the ejection side cavity 48 from a suitable mold insert 60. The insert 60 also has a through bore 62 which is sized to closely slidingly receive the shaft 30 of the motor 20. Thus, the motor 20 may be inserted into the open cavity 48 with the motor shaft 30 extending into the insert bore 62 whereupon the projection 58 is received by the notch 56 of the bearing bracket 28. The bearing bracket 28 may then abut surface 64 of the cavity 48 in close intimate contact and the motor 20 can be oriented in a preferred disposition within the mold 40 suitably spaced from the mold cavity wall. With the motor 20 thus positioned, the plates 42 and 46 are so dimensioned and configured to define a plane of separation between them which is coincident with the central axis of the power cord 32 of the motor 20. Semi-cylindrical formations 66 are defined in the mold plates 42 and 46 to form a suitable collar 68 around the power cord 32 after injection molding. In a manner well-known in the art, a gate 70 is provided through plates 44, 52 and 54 and into communication with the mold cavity for injection of liquid resinous material into the closed mold 40.

It can now be appreciated that once a motor 20 is inserted into the cavity 48 of the mold 40 with the bearing bracket 28 abutting the plate surface 64, and thus with the projection 58 in engagement with the notch 56, the motor 20 is supported within the mold 40 with adequate space around it to receive a jacket 72 of resinous material thereby completely encapsulating the motor 20. A suitable material for molding the jacket 72 is a self-extinguishing polypropylene injected at a temperature of approximately 400° F. By locating the gate 70 on the opposite side of the mold 40 away from the bearing bracket 28 of the motor, the injected plastic tends to force the motor 20 against the "B" plate 46 and prevent liquid plastic from flowing under the bearing bracket 28 into contact with the motor shaft 30. Thus, the shaft 30 is not contaminated with injected material, nor is the associated shaft support bearing.

It has been discovered through experimentation and testing that a pump 10 as thus constructed may tend to leak water around the power cord 30 and into the motor 20 when submerged over extended periods of time. This is due to the fact that the preferred polypropylene material does not effectively bond to the outer jacket of a standard power cord. Accordingly, to eliminate this water leakage it has been found that a simple metal ring 74 may be crimped around the power cord 30 at the jacket collar 68. The polypropylene will thereby suitably bond to the ring 74 and eliminate leakage. The ring 74 also serves to provide the dual purpose of strain relief for the cord 30.

Figure 7:
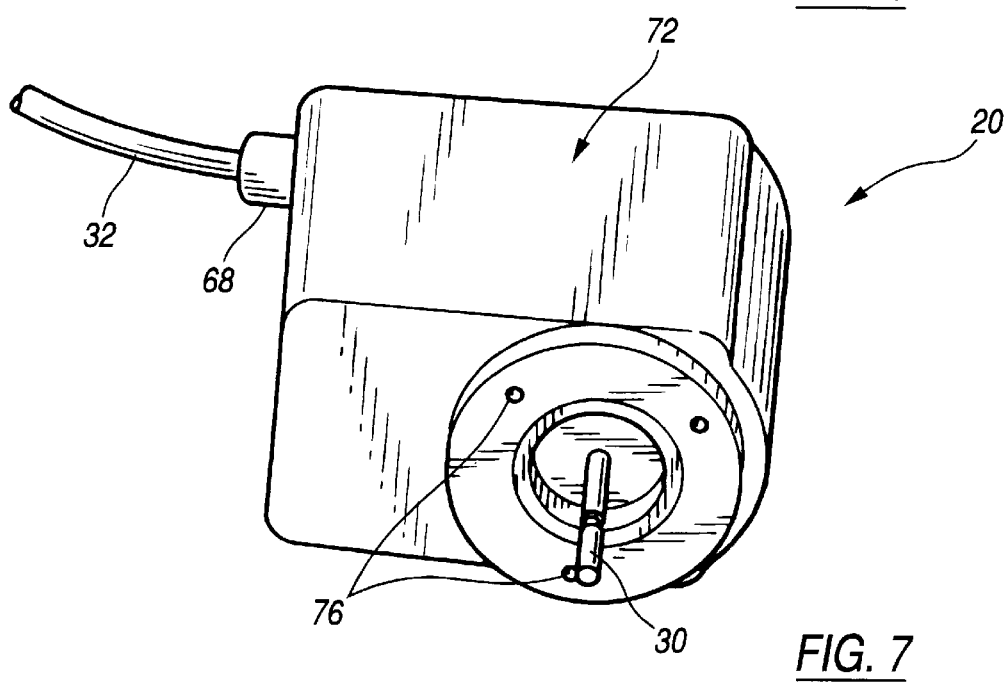
FIG. 7 is a perspective view of a motor which has been encapsulated in the mold according to the principles of the invention.

As thus constructed, the motor 20 may be encapsulated and ejected from the mold 40 in a matter of 60 seconds or so, which compares most favorably with epoxy encapsulation methods. As also shown in FIG. 7, the motor jacket 72 may be molded with a plurality of closed bores 76 for receiving self-tapping screws to conveniently fasten the pump to the motor.

It may also be appreciated that instead of a notch 56 and projection 58 arrangement for locating the motor 20 in the mold cavity 48, a simple pin (not shown) may extend from the insert 60 and cooperate with a suitably positioned hole in the bearing bracket 28.

While the present invention has been described in connection with a preferred embodiment thereof, it will be apparent to those skilled in the art that many changes and modifications may be made without departing from the true spirit and scope of the present invention. Accordingly, it is intended by the appended claims to cover all such changes and modifications as come within the true spirit and scope of the invention.

What is claimed is:

1. A method for constructing a liquid-impervious electric motor assembly comprising the steps of:

providing an electric motor having an armature and associated drive shaft wherein said drive shaft is supported by a bearing bracket, said bearing bracket being provided with a notch, said motor further having an associated power cord extending therefrom;

providing a multi-piece mold having an internal cavity which is larger in size than the size of said motor and with one part of said mold having an aperture for slidingly receiving said motor shaft and supporting said motor within said cavity, said one mold part further having a projection alignable with said notch of said bearing bracket, said mold further being separable about a plane substantially coincident with the central axis of said motor power cord when said motor is supported within said cavity;

inserting said motor shaft into said aperture with said mold separated and moving said bearing bracket into abutment with said one mold part engaging said notch with said projection to retain said motor in a fixed orientation within said mold cavity when said motor shaft is inserted into said aperture and said bearing bracket is moved into abutment with said one mold part;

closing said mold with said power cord exiting therefrom;

injecting liquid resinous material into said closed mold to thereby form a jacket around said motor;

allowing said resinous material to cool and harden;

opening said mold; and ejecting said jacketed motor from said mold cavity.

2. The method of claim 1 wherein said liquid resinous material is injected into said cavity through a gate disposed in a side of said mold opposite said cavity from said one mold part.

3. The method of claim 1 including the step of providing a recess in said mold to define a collar around said power cord at the location in which the power cord extends from said motor.

4. The method of claim 3 including the step of providing a ring member around said power cord wherein said ring member becomes embedded in said collar when said resinous material is injected into said mold.

5. The method of claim 1 wherein said bearing bracket is configured to define an annular surface for intimate abutment with said one mold part.

6. The method of claim 1 wherein said one mold part comprises an insert formed in an ejection cavity mold plate.

7. A method for constructing a liquid-impervious electric motor assembly comprising the steps of:

providing an electric motor having an armature and associated drive shaft wherein said drive shaft is supported by a bearing bracket, said motor further having an associated power cord extending therefrom;

providing a multi-piece mold having an internal cavity which is larger in size than the size of said motor and with one part of said mold having an aperture for slidingly receiving said motor shaft and supporting said motor within said cavity;

providing interengaging means between said bearing bracket and said one mold part for aligning said motor in said mold, said interengaging means including a notch and a cooperating projection wherein said notch is formed in said bearing bracket and said projection projects into said cavity from said one mold part;

inserting said motor shaft into said aperture with said mold separated and moving said bearing bracket into abutment with said one mold part whereupon said interengaging means causes said motor to be aligned in said mold;

closing said mold with said power cord exiting therefrom;

injecting liquid resinous material into said closed mold to thereby form a jacket around said motor;

allowing said resinous material to cool and harden;

opening said mold; and ejecting said jacketed motor from said mold cavity.

* * * * *